(12) United States Patent
Wakashiro et al.

(10) Patent No.: US 6,216,465 B1
(45) Date of Patent: Apr. 17, 2001

(54) CONTROL SYSTEM FOR HYBRID VEHICLE

(75) Inventors: Teruo Wakashiro; Shinichi Kitajima; Kazutomo Sawamura; Shigetaka Kuroda; Atsushi Matsubara; Yasuo Nakamoto, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/459,334

(22) Filed: Dec. 13, 1999

(30) Foreign Application Priority Data

Dec. 17, 1998 (JP) .................................. 10-359831

(51) Int. Cl.[7] .................................................. F01B 21/04
(52) U.S. Cl. ........................... 60/706; 180/652; 180/65.3
(58) Field of Search .................... 60/698, 706; 180/65.1, 180/65.2, 65.3

(56) References Cited

U.S. PATENT DOCUMENTS 5,806,617 * 9/1998 Yamaguchi ........................ 180/65.2
6,054,844 * 4/2000 Frank ..................................... 322/16

* cited by examiner

Primary Examiner—Hoang Nguyen
(74) Attorney, Agent, or Firm—Armstrong, Westerman, Hattori, McLeland & Naughton, LLP

(57) ABSTRACT

A control system is provided for a hybrid vehicle with an engine, a motor, and a power storage unit. The control system comprises: an assist trigger threshold value setting device for setting a throttle opening state when the motor starts assist for the output from the engine; a throttle opening state lower limit setting device for setting a lower limit by subtracting a predetermined value from the threshold value obtained by the assist trigger threshold value setting device; a generation reduction device for gradually reducing the generation by the motor between the lower limit and the threshold value so that the generation finally becomes zero when the present throttle opening state reaches the threshold value, when the vehicle shifts from a generation state, in which the motor acts as a generator and the output is supplied only from the engine, to an output assist state in which the motor assists the output.

1 Claim, 8 Drawing Sheets

CONTROL SYSTEM FOR HYBRID VEHICLE

BACKGROUND OF THE INVENTION

1. Field of the Invention

This invention relates to a control system for a hybrid vehicle, and in particular, to a control system for a hybrid vehicle which reduces a shock when the vehicle shifts from a cruise mode for generating electric power without assisting the driving shaft of the engine to an acceleration mode for assisting the engine.

This application is based on Japanese Patent Application No. Hei 10-359831, the contents of which are incorporated herein by reference.

2. Background Art

Conventionally, hybrid vehicles which carry motors as power sources for driving the vehicles in addition to engines are known. Hybrid vehicles are divided into series hybrid vehicles and parallel hybrid vehicles. In series hybrid vehicles, the engine drives a generator, which outputs electric power to the motor, and the motor drives the wheels.

Because the engine and the wheels are not mechanically connected, the engine constantly runs within a rotational range which reduces fuel consumption and emissions, as compared with conventional engine vehicles.

In parallel hybrid vehicles, the motor connected to the engine assists the rotation of the drive shaft of the engine while charging a battery using a generator which is separate from the motor or is the motor itself.

Although the engine and the wheels are mechanically connected, the parallel hybrid vehicle can reduce the load to the engine. Thus, the parallel hybrid vehicle also has reduced fuel consumption and emissions as compared with conventional engine vehicles.

In the parallel hybrid vehicle, the motor for assisting the output of the engine is directly connected to the output shaft of the engine, and acts as a generator for charging the battery when the vehicle speed is reduced. Alternatively, either or both of the engine and the motor may generate the drive power, and the generator may be provided separately.

When a hybrid vehicle accelerates, the engine is assisted by the motor, and, when it decelerates, various operations are performed, such as charging the battery by deceleration regeneration, so as to maintain sufficient electric energy in the battery (hereinafter referred to as the "state of charge (remaining charge)") to meet the driver's demands (as disclosed in, for example, Japanese Patent Application, First Publication No. Hei 7-123509).

In conventional hybrid vehicles, particularly, in parallel hybrid vehicles, when the vehicle is cruising, the motor does not perform the torque assist for the driving shaft of the engine, while the motor acts as a generator for generating electric energy to increase the remaining charge.

However, when the generation is started during the cruising, the driver may depress an accelerator pedal so that the vehicle enters the acceleration mode, which may cause a shock.

When the vehicle enters the acceleration mode, the motor normally performs the torque assist, that is, adds a torque to the torque from the engine. When the motor as the generator generates, i.e., 2 kW during the cruising and performs the assist of 2 kW in the acceleration mode, a variation of 4 kW in total occurs in the output. This variation in the output causes a shock greater than anticipated when the vehicle accelerates, and the driver may feel uneasy.

SUMMARY OF THE INVENTION

It is therefore an object of the present invention to provide a control system for a hybrid vehicle which reduces a shock when the vehicle shifts from the cruise mode to the acceleration mode.

The control system is provided for a hybrid vehicle with an engine (E) for producing a driving force for the vehicle, a motor (M) for producing an assist driving force to assist the output from the engine, and a power storage unit (capacitor 3) for supplying electric energy to the motor and storing regenerated energy produced by regeneration of the motor when the vehicle decelerates. This control system comprises: an assist trigger threshold value setting device (step S121) for setting a throttle opening state when the motor starts assist for the output from the engine; a throttle opening state lower limit setting device (step S314) for setting a lower limit (MASTFL) by subtracting a predetermined value ($\Delta$TH for the throttle opening state TH) from the threshold value (final threshold value MASTF for assist trigger) obtained by the assist trigger threshold value setting device; and a generation reduction device (step S316) for gradually reducing the generation by the motor between the lower limit and the threshold value so that the generation finally becomes zero when the present throttle opening state reaches the threshold value, when the vehicle shifts from a generation state, in which the motor acts as a generator and the output is supplied only from the engine, to an output assist state in which the motor assists the output.

When the driver depresses the accelerator pedal in the generation state so that the throttle opening state reaches the lower limit, the generation reduction device gradually reduces the generation until the throttle opening state reaches the threshold value for the assist trigger, at which point the generation becomes zero, thereby allowing the vehicle to enter the output assist state.

According to the present invention, when the vehicle shifts from a generation state to an output assist state to allow the motor to assist the output, the generation becomes zero at the starting of the motor assist. Therefore, the invention prevents a shock due to the disappearance of the negative torque produced by the generation, thus minimizing discomfort for the driver.

The generation state, in which the motor acts as a generator, may correspond to a cruise mode (step S8), and the output assist state, in which the motor assists the output from the engine, may correspond to an acceleration mode (step S7). In this configuration, when the driver depresses the accelerator pedal in the cruise mode so that the throttle opening state reaches the lower limit, the generation reduction device gradually reduces the generation until the throttle opening state reaches the threshold value for the assist trigger, at which point the generation becomes zero, thereby allowing the vehicle to enter the output assist state.

The threshold value for the assist trigger may be corrected, based on the atmospheric pressure (PA). When the vehicle runs in the rarefied air in a low atomospheric pressure area such as highlands, the threshold value for the assist trigger may be increased, thus providing an improved riding comfort, taking into consideration the atmospheric pressure.

DETAILED DESCRIPTION OF THE PREFERRED EMBODIMENTS

The present invention will be explained with reference to the figures.

Figure 1:
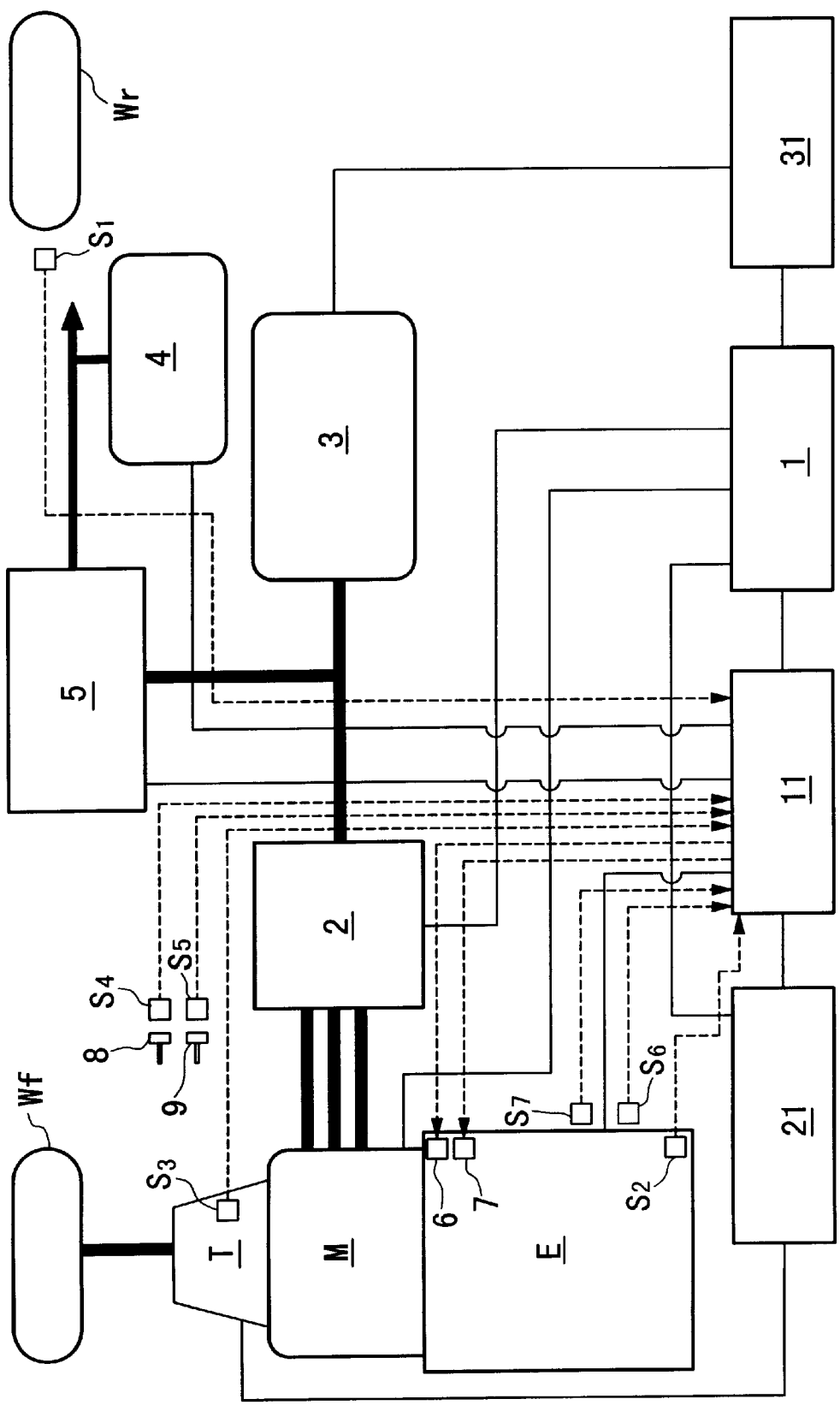
FIG. 1 is a schematic diagram showing the overall structure of the hybrid vehicle of the present invention.

FIG. 1 shows the embodiment applied to a parallel hybrid vehicle. Driving forces from an engine E and a motor M are transmitted via a transmission T, such as an automatic transmission or a manual transmission, to front wheels Wf which are the drive wheels. When the hybrid vehicle decelerates and the driving force is transmitted from the front wheels Wf to the motor M, the motor M acts as a generator to generate a regenerative braking force, so that the kinetic energy of the vehicle body is stored as electric energy.

The driving and regeneration by the motor M are performed by a power drive unit 2 according to control commands from a motor ECU 1. A high voltage capacitor 3 for sending and receiving electric energy to and from the motor M is connected to the power drive unit 2. The capacitor 3 includes a number of modules connected in series, and in each module a number of cells are connected in series. The hybrid vehicle includes a 12 volt auxiliary battery 4 for driving various accessories. The auxiliary battery 4 is connected to the capacitor 3 via a downverter 5. The downverter 5, controlled by an FIECU 11, reduces the voltage from the capacitor 3 and charges the auxiliary battery 4.

The FIECU 11 controls, in addition to the motor ECU 1 and the downverter 5, a fuel supply amount controller 6 for controlling the amount of fuel supplied to the engine E, a starter motor 7, an ignition timing, etc. Therefore, the FIECU 11 receives a signal from a speed sensor $S_1$ for detecting the vehicle speed V based on the rotation of the rear wheels Wr as follower wheels, a signal from an engine rotational speed sensor $S_2$ for detecting the engine rotational speed NE, a signal from a shift position sensor $S_3$ for detecting the shift position of the transmission T, a signal from a brake switch $S_4$ for detecting operation of a brake pedal 8, a signal from a clutch switch $S_5$ for detecting operation of a clutch pedal 9, a signal from a throttle valve opening sensor $S_6$ for detecting the throttle opening state TH, and a signal from an air intake passage pressure sensor $S_7$ for detecting the air intake passage pressure PB. In FIG. 1, reference numeral 21 denotes a CVTECU for controlling a CVT, and reference numeral 31 denotes a battery ECU for protecting the capacitor 3 and calculating the state of charge (remaining charge) QCAP of the capacitor 3.

The control modes of the hybrid vehicle are "idle mode", "deceleration mode", "acceleration mode", and "cruise mode."

[Determination of Motor Operation Mode]

Figure 2:
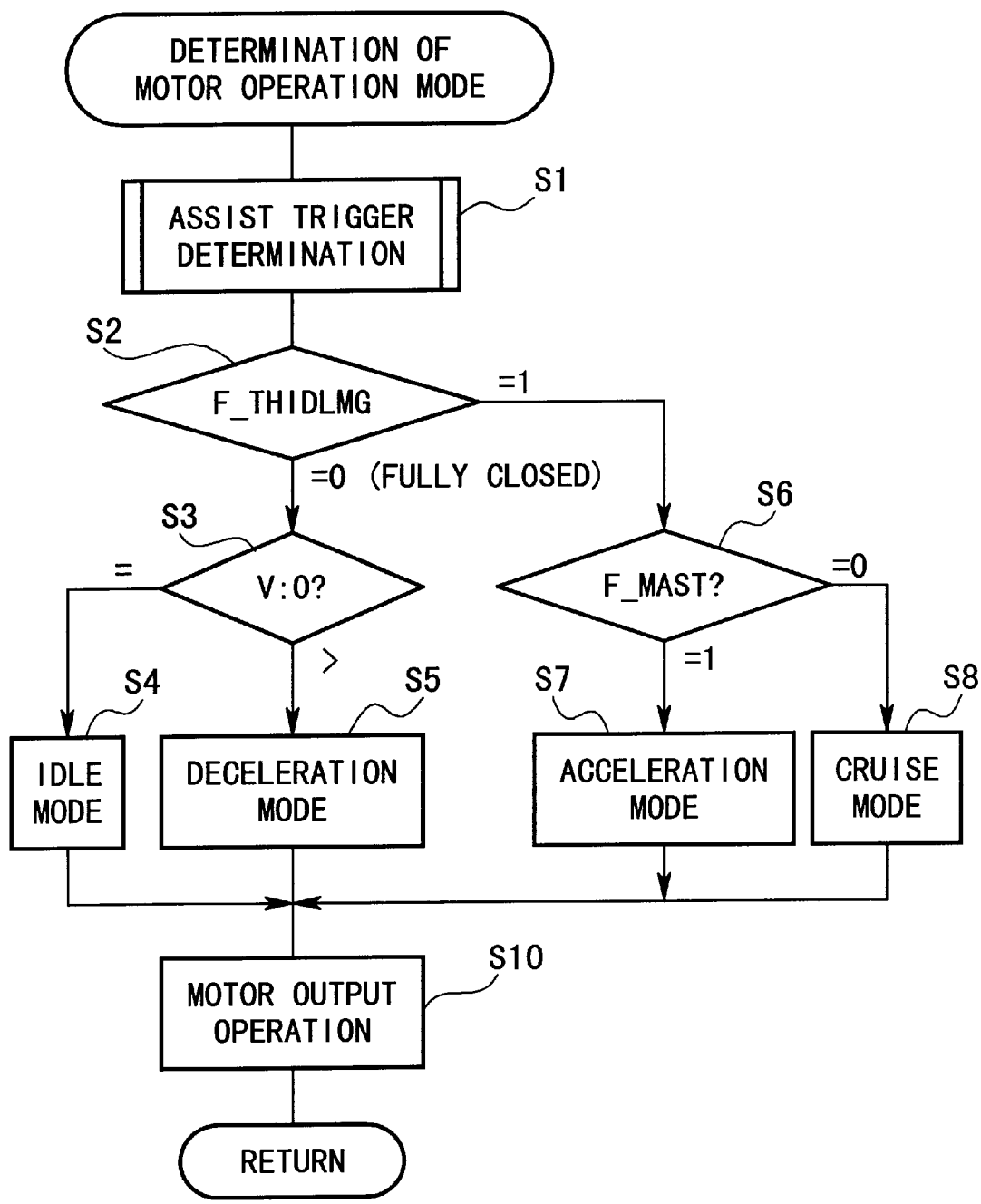
FIG. 2 is a flowchart showing a determination of the motor operation mode of the present invention.

Referring to the flowchart of FIG. 2, the process for determining a motor operation mode will be explained.

In step S1 in the flowchart of FIG. 2, an assist trigger determination, which is also described later, is made. Then, in step S2 it is determined whether the throttle is completely closed based on a throttle-completely-closed-state determination flag F_THIDLMG.

When in step S2 the throttle-completely-closed-state flag F_THIDLMG is 0, that is, when the throttle valve is completely closed, and when in step S3 the vehicle speed V detected by the vehicle speed sensor $S_1$ is 0, that is, when the vehicle is stopped, the idle mode is selected in step S4, and the engine E is maintained in an idling state.

When in step S2 the throttle-closing-state flag F_THIDLMG is 0, that is, when the throttle valve is completely closed, and when in step S3 the vehicle speed V detected by the vehicle speed sensor $S_1$ is not 0, the deceleration mode is selected in step S5, and then regenerative braking by the motor M is carried out. The capacitor 3 is charged with the regenerated energy.

When in step S2 the throttle-closing-state flag F_THIDLMG is 1, that is, when the throttle valve is opened, the flow proceeds to step S6. Then, the motor assist determination flag F_MAST is read to select the acceleration mode or the cruise mode.

When in step S6 the motor assist determination flag F_MAST is 1, the acceleration mode is selected in step S7, and the motor M assists the engine E. When in step S6 the motor assist determination flag F_MAST is 0, the cruise mode is selected in step S8, the motor M is not driven, and the vehicle runs only by the driving force from the engine E. In step S9, the output from the motor is provided corresponding to each mode.

The "assist trigger determination" in step S1 will be explained with reference to FIGS. 3 to 7, "acceleration mode" in step S7 will be explained with reference to FIG. 8, and "cruise mode" in step S8, which is a feature of the invention, will be explained with reference to FIGS. 9 to 12.

[Assist Trigger Determination]

Figure 3:
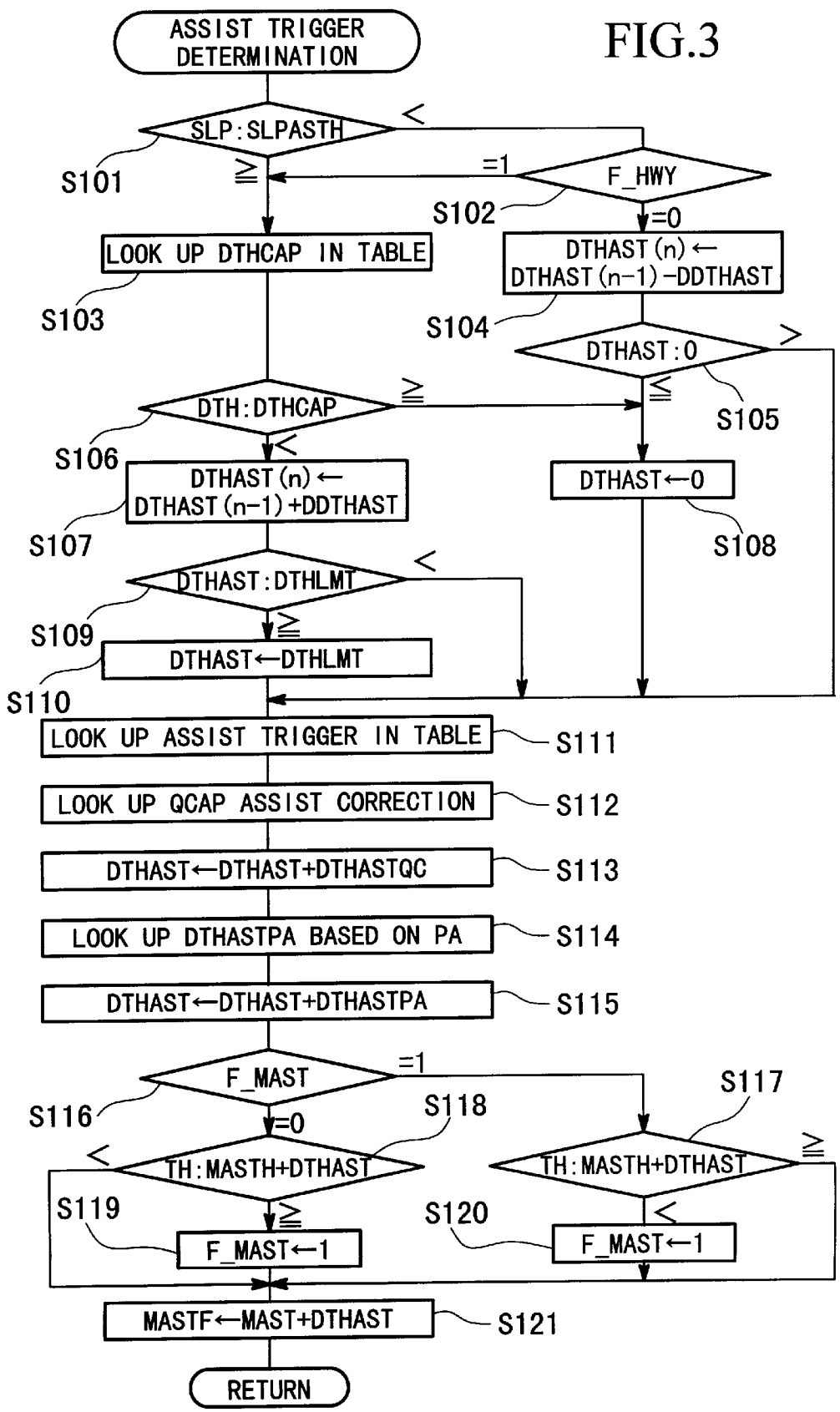
FIG. 3 is a flowchart for an assist trigger determination of the present invention.

The process for the assist trigger will be explained with reference to the flowchart of FIG. 3.

In step S101, the road slope SLP is compared with a lower limit slope SLPASTH. The road gradient SLP is calculated, for example, by the slope calculation process disclosed in Japanese Patent Application, First Publication No. Hei 10-67167. The process calculates the slope based on a slope resistance obtained by extracting the running resistance and acceleration resistance from the drive wheel torque. This lower limit slope SLPASTH is, i.e., 1%.

When the road slope SLP is equal to or above the lower limit slope SLPASTH, the flow proceeds to step S103. When the road slope SLP is below the lower limit slope SLPASTH, it is determined, based on a high speed determination flag F_HWY, whether the vehicle is cruising at a high speed. When the vehicle is at a high speed, an average vehicle speed is calculated, based on the vehicle speed which continuously varies. Then, it is determined whether the deviation of the present vehicle speed with respect to the average vehicle speed is below a predetermined value. When the vehicle is cruising at a high speed, the high speed determination flag F_HWY is set to 1. In other cases, the high speed determination flag is set to 0. The predetermined value is chosen to be small (for example, 5 km/h) to ensure an appropriate determination of whether the vehicle is running at a constant speed. The high speed cruising does not simply mean that the vehicle speed is high, but means that the vehicle is running at a constant speed.

When in step S102 the high speed determination flag F_HWY is 1, the flow proceeds to step S103, where a lower limit DTHCAP of the throttle opening state (e.g., a throttle opening degree, or a throttle opening amount) for determining whether the throttle operation speed (change in the throttle opening state per unit time) is high or not is looked up in a table.

Figure 4:
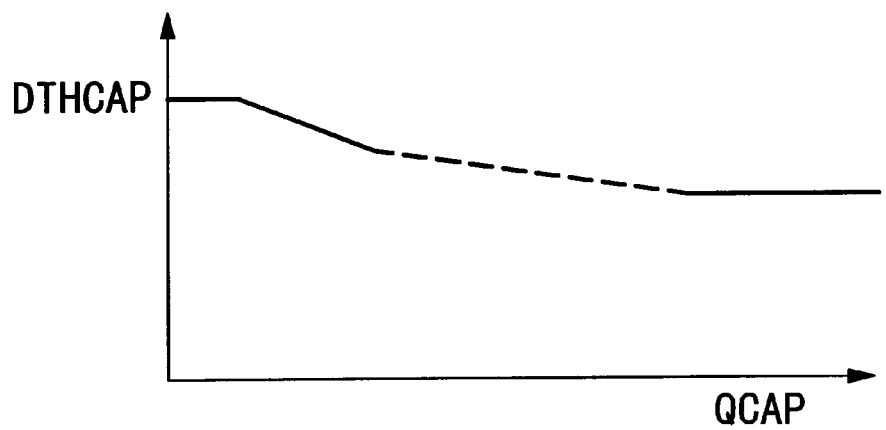
FIG. 4 is a graph showing a table for correcting a variation in throttle opening state according to present invention.

As shown in FIG. 4, according to the table, the TH lower limit DTHCAP varies, depending on the remaining charge QCAP of the capacitor 3. When the QCAP is insufficient, the DTHCAP is increased. In this situation, the system does not determine that the throttle operation speed is high, unless the throttle opening state TH is considerably increased by the throttle operation. When the QCAP is sufficient, the DTHCAP is decreased. Therefore, even when the throttle opening state TH is small, it is determined that the throttle operation speed is high.

The TH lower limit DTHCAP is a standard indicating the driver's intention to accelerate the vehicle when the throttle operation speed is above the TH lower limit DTHCAP. As the remaining charge QCAP of the capacitor 3 decreases, the standard for the throttle opening state for determining whether the throttle operation speed is high is increased, thereby reducing the frequency of determining that the driver intends to accelerate the vehicle.

As the remaining charge QCAP of the capacitor 3 decreases, the vehicle is more disposed to enter the cruise mode, as compared with the case when the QCAP is high. Therefore, the frequency of charging the capacitor is increased in the cruise mode, thereby increasing the remaining charge QCAP quickly.

When in step S102 the high speed determination flag F_HWY is 0, the flow proceeds to step S104, where an increment DTHAST to be added to a threshold value for the assist trigger is decreased by an adjustment DDTHAST. In step S105, the increment DTHAST is compared with 0.

When in step S105 the increment DTHAST is above 0, the flow proceeds to step S111 of looking up the assist trigger in a table. When the increment DTHAST is equal to or below 0, the increment DTHAST is set to 0, and the flow proceeds to step S111.

When in step S103 the TH lower limit DTHCAP is looked up in the table, a present variation DTH in throttle opening state is compared with the TH lower limit DTHCAP in step S106.

When the present variation DTH in throttle opening state is equal to or above the TH lower limit DTHCAP, the flow proceeds to step S108, where the increment DTHAST to be added to the threshold value for the assist trigger is set to 0. Then, the flow proceeds to step S111.

When the present variation DTH in throttle opening state is equal to or above the TH lower limit DTHCAP, the system recognizes the driver's intention to accelerate the vehicle, and the increment DTHAST to be added to the threshold value MAST for the assist trigger is set to 0 so that the vehicle is more disposed to enter the acceleration mode.

When in step S106 the variation DTH in throttle opening state is below the TH lower limit DTHCAP, the adjustment DDTHAST is repeatedly added to the increment DTHAST for assist trigger in step S107, and is compared with an upper limit DTHLMT of the threshold value for the assist trigger in step S109.

Thus, when the present variation DTH in throttle opening state is below the TH lower limit DTHCAP, the increment DTHAST is added to the threshold value for the assist trigger. Therefore, when the driver depresses the accelerator pedal to increase the throttle opening state, e.g., when the vehicle climbs a slope, the vehicle is less disposed to enter the acceleration mode. That is, when the vehicle climbs a slope, the driver, who feels that the torque is low, may depress the accelerator pedal to maintain the speed. In this situation, if the vehicle enters the acceleration mode, the driver may feel uneasy because of the sudden acceleration. To avoid this, this invention increases the threshold value for the assist trigger so that the vehicle is less disposed to enter the acceleration mode.

When in step S109 the increment DTHAST for the threshold value for the assist trigger is equal to or above the upper limit DTHLMT, the increment DTHAST is set to the upper limit DTHLMT in step S110. When the increment DTHAST is below the upper limit DTHLMT, the flow proceeds to step S111.

Figure 5:
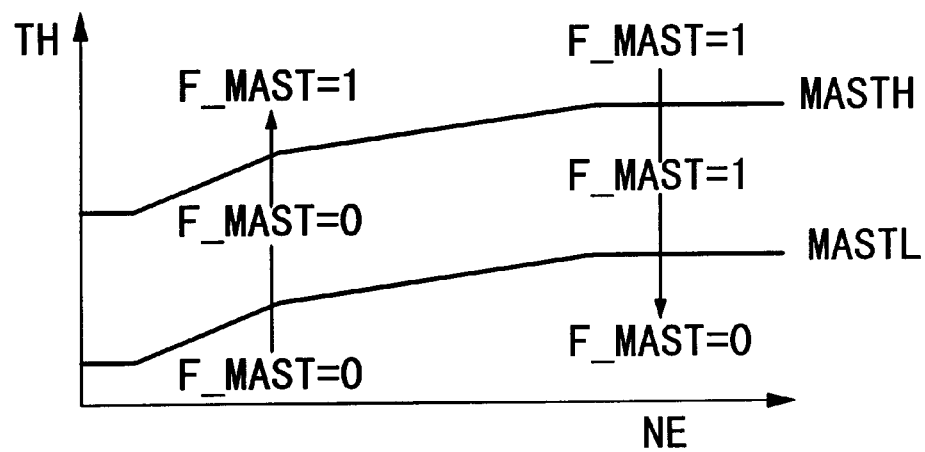
FIG. 5 is a graph showing a threshold value for the assist trigger according to the present invention.

In step S111, the threshold value MAST for assist trigger is looked up in an assist trigger table as shown in FIG. 5.

The assist trigger table is based on the parameters of the throttle opening state TH, detected by the throttle opening state sensor $S_6$, and of the engine rotational speed NE detected by the engine rotational speed sensor $S_2$. When the throttle opening state TH is high based on the engine rotational speed NE, the acceleration mode is selected. When the throttle opening state TH is low, the cruise mode is selected. On the other hand, when the engine rotational speed NE is decreased while the throttle opening state TH is maintained, the acceleration mode is selected. When the engine rotational speed NE is increased, the cruise mode is selected.

The assist trigger table includes the hysteresis. When the throttle opening state TH, as it is increased or as the engine rotational speed NE is decreased, crosses the upper threshold value line MASTH from the lower area to the upper area, the motor assist determination flag F_MAST is switched from 0 to 1. When the throttle opening state TH, as it is decreased or as the engine rotational speed NE is increased, crosses the lower threshold value line MASTL from the upper area to the lower area, the motor assist determination flag F_MAST is switched from 1 to 0.

An MT vehicle selects the assist trigger table, depending on the gear positions and on the stoichiometric or the lean-burn state. Also, a CVT vehicle selects the assist trigger table, depending on the gear positions and on the stoichiometric or the lean-burn state.

Figure 6:
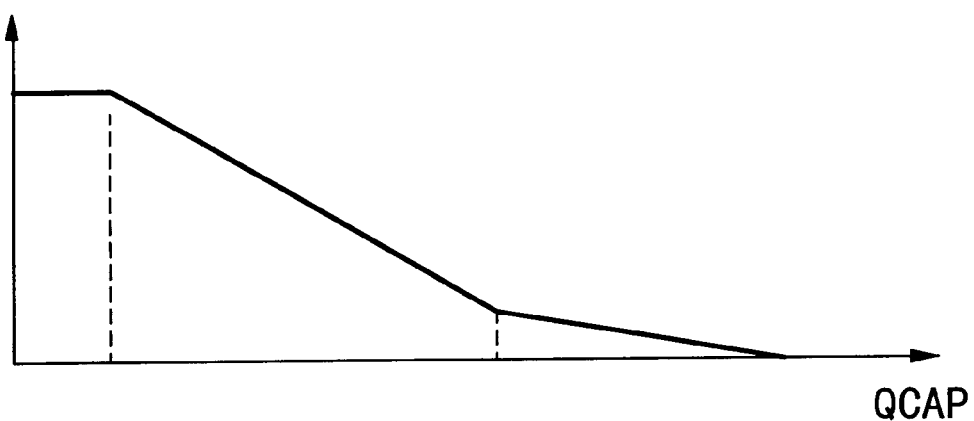
FIG. 6 is a graph showing a correction for the threshold value for the assist trigger.

In step S112, the assist correction is looked up in a QCAP assist correction table shown in FIG. 6, based on the remaining charge of the capacitor 3.

In step S112, a QCAP assist correction throttle value DTHASTQC is looked up. This DTHASTQC is added to the increment DTHAST for the threshold value for the assist trigger, depending on the remaining charge QCAP of the capacitor 3. Specifically, three points are set for the remaining charge QCAP, and the remaining charge QCAP is interpolated between the points, thus to obtain a QCAP assist correction throttle value DTHASTQC corresponding to the present remaining charge QCAP.

For instance, when the entire capacity of the capacitor 3 is 100%, the three points are 20%, 60%, and 100%, which correspond to the throttle opening states TH of 20, 10, and 0 degrees, respectively.

After the completion of the look-up in the QCAP assist correction table, the flow proceeds to step S113, where the QCAP assist correction throttle value DTHASTQC, obtained from the QCAP assist correction table in step S112, is added to the increment DTHAST for the threshold value for the assist trigger, set in steps S110 and S108, to thus obtain a new increment DTHAST.

As shown in FIG. 6, as the remaining charge QCAP decreases, the QCAP assist correction throttle value DTHASTQC increases, so that the increment DTHAST for the threshold value for the assist trigger increases, and the vehicle is less disposed to enter the acceleration mode. On the other hand, as the remaining charge QCAP increases, the QCAP assist correction throttle value DTHASTQC decreases, so that the increment DTHAST is decreased, and the vehicle is more disposed to enter the acceleration mode.

As a result, as the remaining charge QCAP decreases, the vehicle is less disposed to enter the acceleration mode. Therefore, in the cruise mode, the frequency of charge is increased so as to quickly increase the remaining charge QCAP of the capacitor 3. As the remaining charge QCAP increases, the vehicle is more disposed to enter the acceleration mode. Therefore, in the acceleration mode, the frequency of discharge is increased because of the repeated motor assists, avoiding over-charge of the capacitor 3. The assists can respond to the driver's intention to accelerate the vehicle, thus providing an improved riding comfort, while reducing the fuel consumption.

Figure 7:
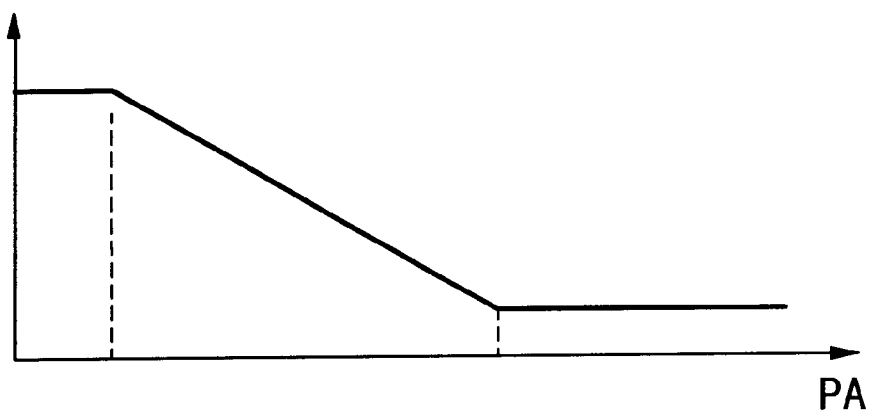
FIG. 7 is a graph showing a table for correcting the value based on the atmospheric pressure according to the present invention.
Figure 8:
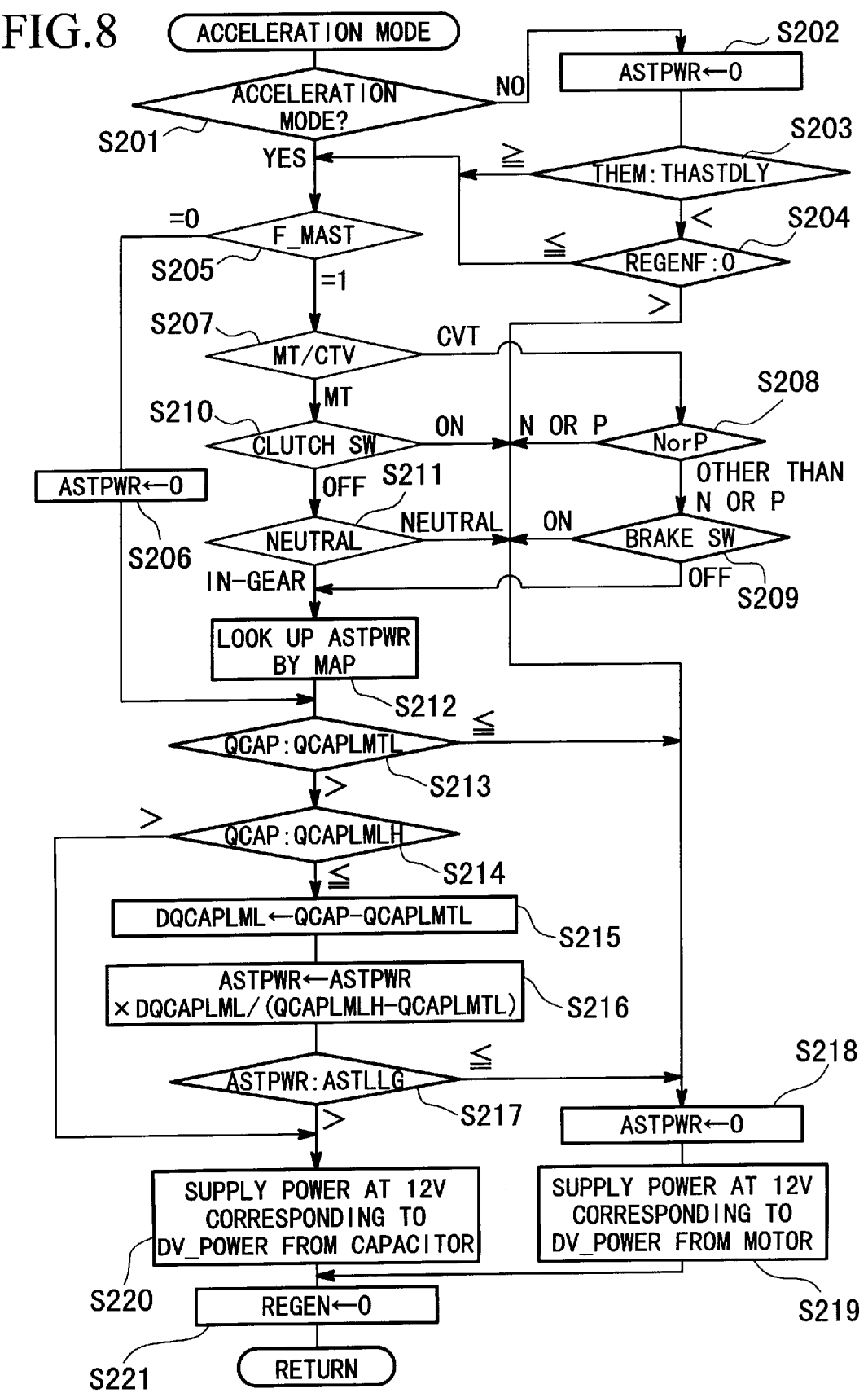
FIG. 8 is a flowchart showing an acceleration mode according to the present invention.

In step S114, a delta value DTHASTPA for the throttle opening state TH is obtained, depending on the atmospheric pressure PA, as shown in FIG. 7. In the rarefied air in a low atmospheric pressure area such as highlands, the driver may depress the accelerator pedal more, while the present invention corrects the throttle opening state, taking in consideration of the depression of the accelerator.

That is, because in the rarefied air in highlands the engine torque is decreased, the driver will depress the accelerator pedal more than in lowlands, so that the vehicle frequently enters the acceleration mode. To avoid this, the present invention adjusts the threshold value for the assist trigger.

In step S115, the atmospheric pressure correction throttle value DTHASTPA, obtained by the look-up depending on the PA in step S114, is added to the increment DTHAST for the threshold value for the assist trigger prepared in step S113, to thus obtain a new increment DTHAST. Then, the flow proceeds to step S116.

In step S116, the motor assist determination flag F_MAST is read. When the F_MAST is 0, that is, when the vehicle is in the cruise mode, the flow proceeds to step S118. When the F_MAST is 1, that is, when the vehicle is in the acceleration mode, the flow proceeds to step S117.

When in step S118 the present throttle opening state TH is equal to or above the sum of the upper threshold value MASTH for assist trigger and the increment DTHAST, the motor assist determination flag F_MAST is set to 1 in step S119, and the flow proceeds to step S121. When the present throttle opening state TH is below the sum of the upper threshold value MASTH for assist trigger and the increment DTHAST, the flow proceeds to step S121.

When in step S117 the present throttle opening state TH is below the sum of the lower threshold value MASTL for assist trigger and the increment DTHAST, the motor assist determination flag F_MAST is set to 0 in step S120, and the flow proceeds to step S121. When the present throttle opening state TH is equal to or above the sum of the lower threshold value MASTL for assist trigger and the increment DTHAST, the flow proceeds to step S121.

In step S121, the increment DTHAST is added to the threshold value for the assist trigger, to thus obtain the final threshold value MASTF for assist trigger, and the flow returns.

Thus, even in the rarefied air at a low atmospheric pressure PA, e.g., in highlands, the delta value DTHAST is added to calculate the final threshold value MASTF for assist trigger, taking into consideration the atmospheric pressure PA. Therefore, even when the vehicle is running on a highland while the depression of the accelerator pedal is increased due to the low engine torque, the frequency of entry into the acceleration mode is reduced.

As described above, the TH lower limit DTHCAP is determined depending on the remaining charge QCAP of the capacitor 3, and is compared with the present throttle state TH. Based on this comparison, the increment DTHAST for the threshold value for the assist trigger is determined. Based on the remaining charge QCAP, the QCAP assist correction throttle value DTHASTQC is obtained. These DTHAST and DTHASTQC values are added to the threshold value MAST for assist trigger. Even when the vehicle uses a capacitor whose capacity is in general less than a battery, the power of the capacitor 3 can be managed efficiently.

[Acceleration Mode]

Next, the acceleration mode will be explained with reference to the flowchart of FIG. 8.

Initially, in step S201, it is determined whether the acceleration mode is selected. When the acceleration mode is not selected, the assist amount ASTPW is set to 0 in step S202. When in step S201 the acceleration mode is selected, the flow proceeds to step S205.

In step S203, the present value THEM of the throttle opening state TH is compared with a throttle state THAST-DLY for determining whether to start the assist. When in step S203 the THEM<the THASTDLY, a decrement REGENF in generated electric energy is compared with 0 in step S204. When in step S204 REGENF≦0, the flow proceeds to step S205. When in step S204 REGENF>0, the flow proceeds to step S218. When in step S203 the THEM≧the THASTDLY, the flow proceeds to step S205.

In step S205, the motor assist determination flag F_MAST is read. When in step S205 the F_MAST is 0, the assist amount ASTPWR is set to 0 in step S206, and the flow proceeds to step S213. On the other hand, when the F_MAST is 1, the flow proceeds to step S207.

In step S207, it is determined which transmission the vehicle has, an MT or a CVT. When the vehicle has the CVT, the shift position is detected in step S208. When in step S208 the transmission is in the neutral position (N) or the parking position (P), the assist amount ASTPWR is set to 0 so as not to perform the motor assist in step S218, and electric energy corresponding to the consumed electric power, at 12 volts, is regenerated and is supplied to the auxiliary battery 4 in step S219. In steps S219 and S220, reference character DV denotes the downverter 5.

When in step S208 the transmission is at a position other than the N-position and the P-position, the ON-OFF state of the brake switch $S_4$ is detected in step S209. When in step S209 the brake switch $S_4$ is turned on, the flow proceeds to step S218. When in step S209 the brake switch $S_4$ is turned off, the flow proceeds to step S212 described later.

When in step S207 the vehicle has an MT, the ON-OFF state of the clutch switch $S_5$ is detected in step S210. When in step S210 the clutch switch $S_5$ is turned off, it is determined in step S211 whether the transmission is in the neutral position. In an "in-gear" state, the flow proceeds to step S212. When in step S211 the transmission is in the neutral position, or when in step S210 the clutch switch $S_5$ is turned on, the flow proceeds to step S218.

In step S212, the map look-up for the assist amount ASTPWR is performed. The map of the assist amount ASTPWR is defined based on the engine rotational speed NE and the throttle opening state TH in units of kW, and is replaced when an air conditioner is turned on. The map is changed depending on the MT or CVT, the gears in the MT, and the stoichiometric or the lean-burn state. When the map lookup is performed in step S212, the flow proceeds to step S213.

In step S213, the remaining charge QCAP is compared with the lower limit QCAPLMTL. When the QCAP is equal to or below the QCAPLMTL, the flow proceeds to step S218, and the assist is not performed. When the QCAP is above the QCAPLMTL, the flow proceeds to step S214, where the QCAP is compared with an upper limit QCAPLMTH.

When in step S214 the QCAP is above the QCAPLMLH, no correction is required because the QCAP is sufficient, and the flow proceeds to step S220. When the QCAP is equal to or below the QCAPLMLH, the flow proceeds to step S215, where the available charge DQCAPLML of the capacitor 3 is obtained by subtracting the QCAPLMTL from the QCAP, and the assist amount ASTPWR is corrected in step S216.

In step S216 of correcting the assist amount ASTPWR, the available charge DQCAPLML is divided by the difference between the upper limit QCAPLMLH and the lower limit QCAPLMTL, and the result is multiplied by the assist amount ASTPWR obtained in step S212. That is, the assist amount ASTPWR is corrected, depending on the available charge DQCAPLML.

The corrected assist amount ASTPWR is compared with an assist requirement determination value (the value to determine whether the assist is required or not) ASTLLG in step S217. When equal to or below the ASTLLG, the flow proceeds to step S218, and the assist is not performed. When above the ASTLLG, electric energy corresponding to the consumed electric power, at 12 volts, is supplied from the capacitor 3 to the auxiliary battery 4 in step S220. Then, in step S221, the generation REGEN is set to 0, and the flow returns.

[Cruise Mode]

Figure 9:
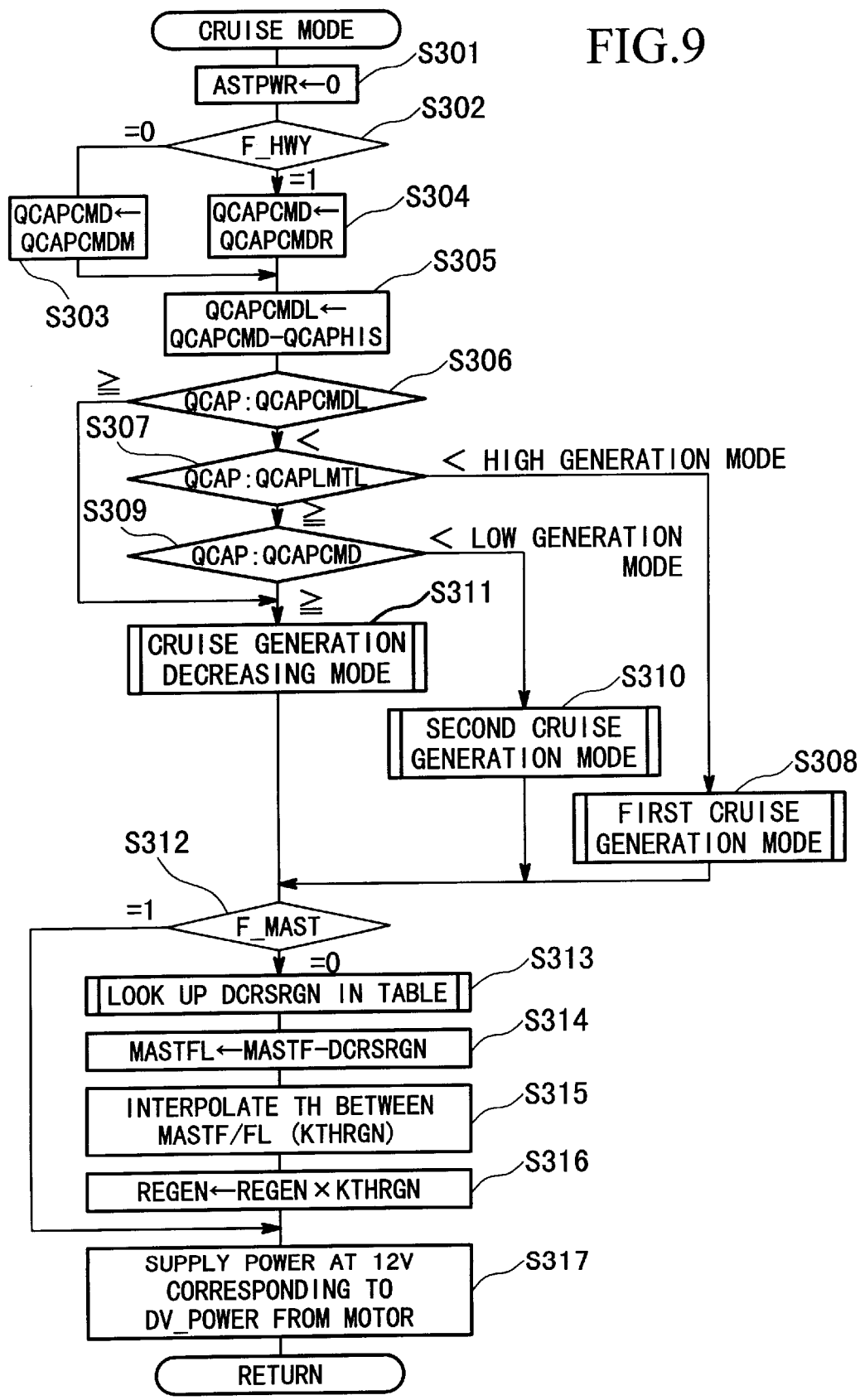
FIG. 9 is a flowchart showing a cruise mode according to the present invention.
Figure 10:
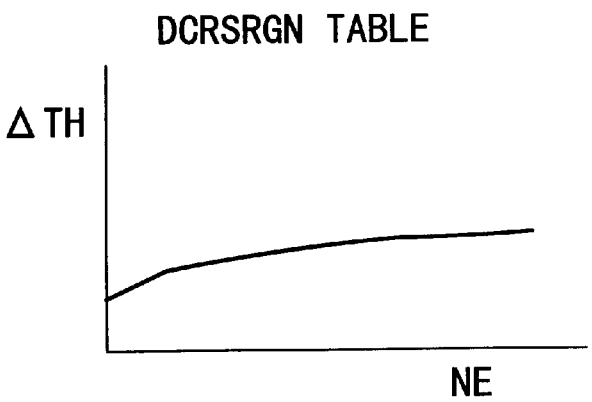
FIG. 10 is a graph showing the throttle opening state from the cruise mode to the acceleration mode according to the present invention.

Next, the cruise mode will be explained with reference to the flowchart of FIG. 9.

When in step S301 the assist amount ASTPWR is set to 0, the high speed determination flag F_HWY is read in step S302. When in step S302 the F_HWY is 0, a command value QCAPCMD for the remaining charge of the capacitor 3 is set to an M command value QCAPCMDM in step S303, and the flow proceeds to step S305.

When in step S302 the F_HWY is 1, the command value QCAPCMD for the remaining charge is set to an R command value QCAPCMDR in step S304, and the flow proceeds to step S305.

In step S305, a low command value QCAPCMDL is obtained by subtracting hysteresis QCAPHIS from the command value QCAPCMD.

In step S306, the remaining charge QCAP is compared with the low command value QCAPCMDL. When in step S306 the QCAP is equal to or above the QCAPCMDL, the vehicle enters a cruise generation decreasing mode in step S311. Thus, the electric energy generation is gradually decreased, thereby avoiding an over-charge of the capacitor 3.

When in step S306 the QCAP is below the QCAPCMDL, the QCAP is compared with the lower limit QCAPLMTL of the remaining charge in step S307.

When in step S307 the QCAP is below the QCAPLMTL, the electric power generation is increased in a first cruise generation mode in step S308. Thus, the remaining charge of the capacitor 3 is urged to increase quickly.

When in step S307 the QCAP is equal to or above the QCAPLMTL, the flow proceeds to step S309.

In step S309, the remaining charge QCAP is compared with the command value QCAPCMD for the capacitor 3. When the QCAP is below the QCAPCMD, a low generation mode, which is a second cruise generation mode, is selected in step S310.

When in step S309 the QCAP is equal to or above the QCAPCMD, the vehicle enters the cruise generation decreasing mode in step S311.

Thus, one of the cruise modes is appropriately selected, depending on the remaining charge. The cruise generation in one of steps S311, S310, and S308 is performed, and the flow proceeds to step S312.

In step S312, the motor assist determination flag F_MAST is read. When it is 1 because the vehicle is in the acceleration mode, electric energy corresponding to the consumed electric power, at 12 volts, is supplied to the auxiliary battery 4 by the regeneration by the motor M in step S317. When in step S312 the F_MAST is 0, that is, when the vehicle is in the cruise mode, the delta value DCRSRGN for the cruise generation is looked up in a table in step S313.

The delta value DCRSRGN table for the cruise generation defines the range ΔTH for the throttle opening state TH, depending on the engine rotational speed NE. Specifically, this table defines when the decrease in electric energy generation is started before the final threshold value MASTF for assist trigger to start the motor assist, that is, the range ΔTH for the throttle opening state TH.

The range ΔTH is defined, depending on the engine rotational speed NE, taking into consideration the performance (engine, motor, etc.) of the vehicle, so as to minimize discomfort for the driver. For instance, when the engine rotational speed NE is 2000 rpm, the ΔTH is 10 degrees.

While in step S121 the final threshold value MASTF for assist trigger is determined, taking into consideration the atmospheric pressure PA, the MASTF is identical to the upper threshold value for throttle assist trigger MASTH when the correction based on the PA is not performed.

Figure 11:
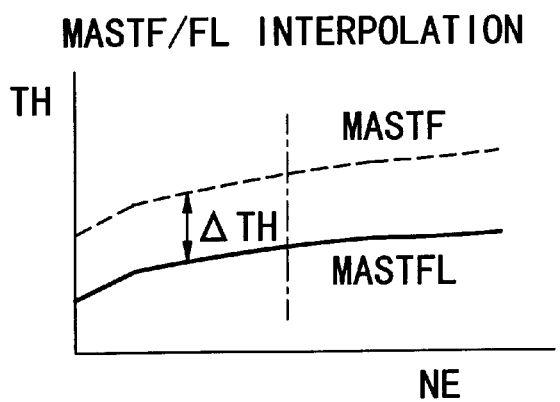
FIG. 11 is a graph showing the threshold value for the throttle opening state according to the present invention.

After the look-up of the range ΔTH in step S313, the ΔTH is subtracted from the final threshold value MASTF for assist trigger, to thereby obtain a lower limit value MASTFL as shown with the solid line in FIG. 11. The lower limit value MASTFL indicates the starting point of decreasing the cruise generation REGEN.

Figure 12:
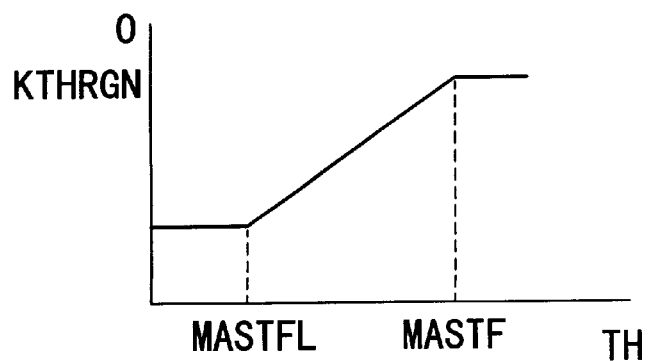
FIG. 12 is a graph showing interpolation of the throttle opening state according to the present invention.

In step S315, as shown in FIG. 12, the throttle opening state TH is interpolated between the lower limit value MASTFL and the final threshold value MASTF, to obtain a throttle generation coefficient KTHRGN (0 to 1). Then, in step S316, the cruise generation REGEN is multiplied by the coefficient KTHRGN, to obtain an amount of generation REGEN in step S315. In step S317, electric energy corresponding to the consumed electric power, at 12 volts, is regenerated by the motor M, is supplied to the auxiliary battery 4, and the flow returns.

The calculation of the generation REGEN in step S316 is based on the map of the air intake passage pressure PB and the engine rotational speed NE. The map is selected, depending on an MT vehicle or a CVT vehicle, and depending on the gear positions.

When the throttle opening state TH is at the lower limit value MASTFL, the generation is maintained because the coefficient KTHRGN is 1. As the TH increases from the MASTFL, the KTHRGN gradually decreases, and the generation REGEN is reduced. When the TH reaches the final threshold value MASTF, the generation REGEN becomes 0 because the coefficient KTHRGN is 0.

As a result, from the cruise mode to the acceleration mode, the generation REGEN is gradually reduced before the starting of the motor assist. When the assist is started, the generation is stopped. Therefore, the negative torque caused by the generation is smoothly decreased, and becomes zero at the starting of the motor assist.

Because, when entering the acceleration mode. the negative torque produced by the generation is 0, a shock due to the starting of the motor assist can be reduced.

The present invention is not limited to the above embodiment, and other processes for correcting the values may be employed. For example, the corrected values may be given by a map, a correction value may be added or extracted, and a correction coefficient may be used.

Although this embodiment uses a capacitor as a power storage unit, it may use a battery.

While in the above embodiments the automatic transmission is a CVT, an automatic multi-stage transmission may also be used.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A control system for a hybrid vehicle with an engine for producing a driving force for said vehicle, a motor for producing an assist driving force to assist the output from said engine, and a power storage unit for supplying electric energy to said motor and storing regenerated energy produced by regeneration of said motor when said vehicle decelerates, said control system comprising:

an assist trigger threshold value setting device for setting a throttle opening state when said motor starts assist for the output from said engine;

a throttle opening state lower limit setting device for setting a lower limit by subtracting a predetermined value from the threshold value obtained by said assist trigger threshold value setting device; and a generation reduction device for gradually reducing the generation by the motor between the lower limit and the threshold value so that the generation finally becomes zero when the present throttle opening state reaches the threshold value, when the vehicle shifts from a generation state, in which the motor acts as a generator and the output is supplied only from the engine, to an output assist state in which said motor assists the output.

\* \* \* \* \*